United States Patent [19]
Fauth et al.

[11] 4,165,931
[45] Aug. 28, 1979

[54] SELF DEVELOPING TYPE PHOTOGRAPHIC APPARATUS

[75] Inventors: Günter Fauth, Unterhaching; Peter Lermann, Narring; Herbert Müller, Assling; Franz Lechner, Munich, all of Fed. Rep. of Germany

[73] Assignee: Agfa-Gevaert AG, Leverkusen, Fed. Rep. of Germany

[21] Appl. No.: 621,247

[22] Filed: Oct. 23, 1975

[51] Int. Cl.[2] .............................................. G03B 17/52
[52] U.S. Cl. ...................................... 354/86; 354/212; 354/304
[58] Field of Search ................... 354/83, 86, 212, 304, 354/84, 85

[56] References Cited

U.S. PATENT DOCUMENTS

| | | | |
|---|---|---|---|
| 3,350,990 | 11/1967 | Finelli et al. | 354/86 |
| 3,757,657 | 9/1973 | Eloranta et al. | 354/86 |
| 3,852,781 | 12/1974 | Erlichman | 354/304 |
| 3,911,452 | 10/1975 | Ueda | 354/86 |
| 3,936,850 | 2/1976 | Goto | 354/86 |

*Primary Examiner*—L. T. Hix
*Assistant Examiner*—Alan Mathews
*Attorney, Agent, or Firm*—Michael J. Striker

[57] ABSTRACT

A self developing type photographic apparatus wherein one of the spread rollers is driven by one or two toothed racks forming part of or constituting a manually reciprocable handle. One of the racks further rotates a gear which programs the movements of an expelling device for exposed film units, the movements of a device which controls the width of the gap between the spread rollers and the cocking of the shutter.

27 Claims, 12 Drawing Figures

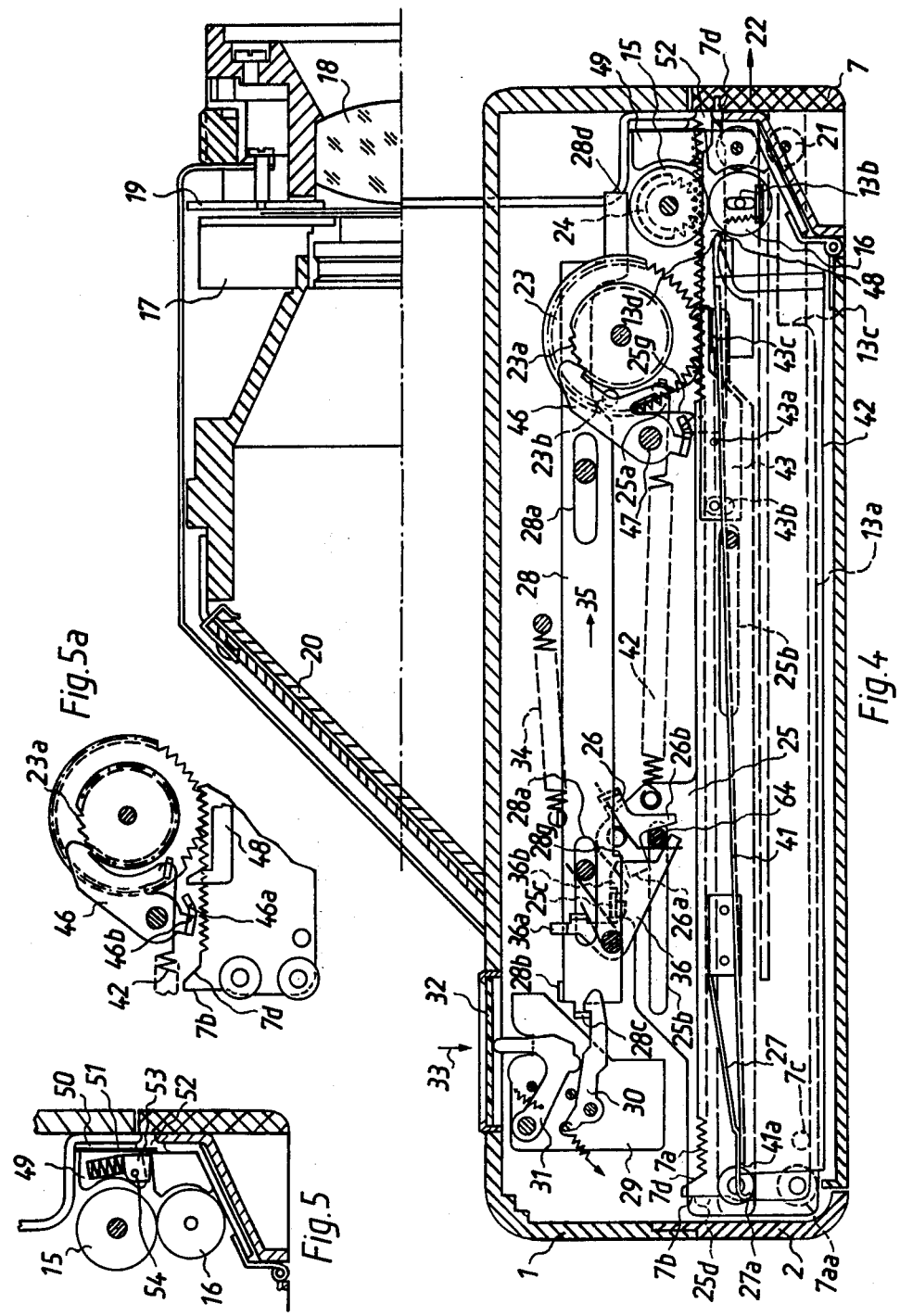

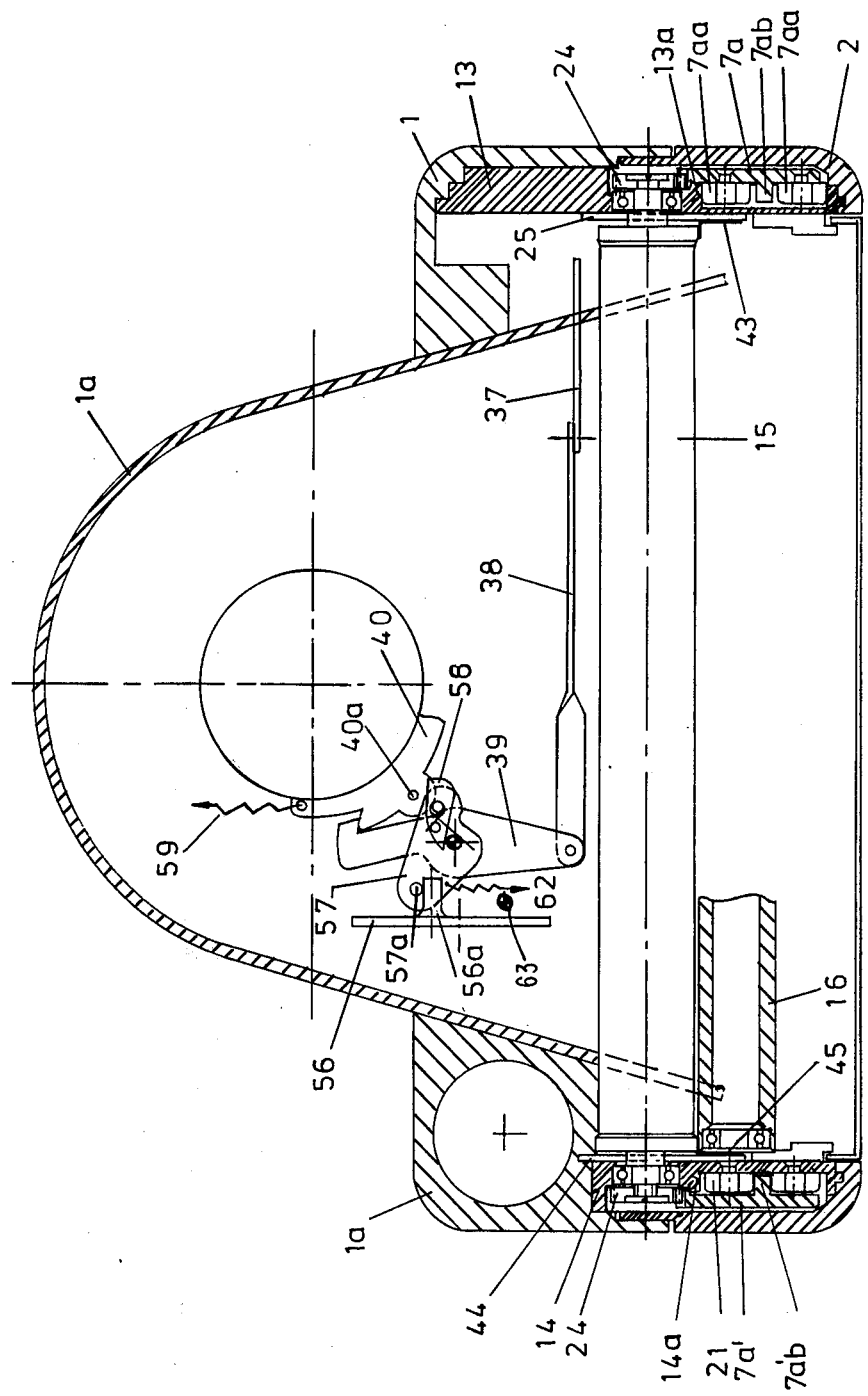

# SELF DEVELOPING TYPE PHOTOGRAPHIC APPARATUS

BACKGROUND OF THE INVENTION

The present invention relates to improvements in self developing type photographic apparatus, and more particularly to improvements in self developing type apparatus wherein the uppermost or outermost film unit of a stack of such units is developed in automatic response to its expulsion from a container which is inserted into the housing whereby the freshly exposed film unit passes through the gap between two spread rollers for a supply of developing liquid.

It is known to equip a self developing type photographic apparatus with an electric motor which can be started to effect the expulsion of a freshly exposed film unit from the container. The sequence in which various steps are performed is regulated by an expensive and highly sensitive electronic control system. These functions include automatically increasing the width of the gap between the spread rollers when the leader of the exposed film unit enters the gap, rotating at least one of the rollers, and arresting the motor when the expulsion of exposed film unit is completed.

It was further proposed to equip a self developing type camera with a handle which effects the movement of an exposed film unit through the gap between the spread rollers. The manipulation of the camera is complex and the camera comprises a large number of components.

SUMMARY OF THE INVENTION

An object of the invention is to provide a simple, compact and inexpensive self developing type photographic apparatus which need not employ an electric motor and wherein all steps beginning with exposure of a film unit to its development and expulsion from the container are performed in an optimum sequence.

Another object of the invention is to provide the apparatus with novel and improved means for driving the spread rollers, for feeding film units into the gap between the rollers, for regulating the movements of one of the rollers relative to the other roller, and for insuring that an exposure can be made only when a fresh film unit is in an optimum position for exposure to scene light.

A further object of the invention is to provide the apparatus with a novel and improved manually operable device for expelling successive film units from their container.

The invention is embodied in a self developing type photographic apparatus for use with film units which are stacked in a container and are developed in response to expulsion from the container subsequent to exposure to scene light. The apparatus comprises a housing having a chamber for containers and an outlet (e.g., a slot in the front wall of the housing) for successive exposed film units, a handle which is reciprocably mounted in the housing and is movable between extended and retracted positions, at least one toothed rack forming part of or connected with the handle and extending in substantial parallelism with the direction of reciprocatory movement of the handle, a pair of parallel spread rollers mounted in the housing and extending substantially at right angles to the aforementioned direction, a gap defined by the rollers and being in line with the outlet, means for rotating one of the rollers in response to reciprocation of the rack so that the one roller advances a film unit which has been introduced into the gap toward and through the outlet while the handle moves toward its extended position, a rotary programming device which receives torque from the rack, means for expelling a freshly exposed film unit from a container in the housing into the gap between the rollers, and control means receiving motion from the programming means to actuate the expelling means in response to rotation of the programming device during movement of the handle to the extended position.

The other spread roller is biased toward the one spread roller by one or more springs, and the apparatus further comprises displacing means serving to move the other roller away from the one roller and to thus increase the width of the gap between the rollers during introduction of the leader of a freshly exposed film unit between the rollers. The one roller comprises a pinion in mesh with the rack and constituting the means for rotating the one roller.

The handle is reciprocable by hand and the container in the housing has a suitable slot for entry of the expelling means during movement of the handle to the extended position to expel the outermost film unit of a stack of such units from the container and into the gap between the spread rollers. The container comprises or contains means (e.g., suitable rupturable pouches or bags) for discharging a developing liquid onto the outermost film unit so that the liquid is caused to spread over and develops the exposed frame of the film unit during passage through the gap between the spread rollers.

The handle may be a U-shaped body or a tray having two parallel portions at least one of which constitutes a rack. If the handle has two racks, the one spread roller has two pinions each of which meshes with a different rack. The diameter of the one spread roller preferably equals or exceeds the pitch diameter(s) of the pinion(s).

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2a is a plan view of the apparatus of FIG. 1a;

FIG. 4 is an enlarged longitudinal vertical sectional view of the photographic apparatus of FIGS. 1-2;

FIG. 5 illustrates a first detail in the structure of FIG. 4;

FIG. 5a illustrates a second detail in the structure of FIG. 4;

FIG. 6 is an enlarged transverse vertical sectional view of the apparatus shown in FIGS. 1-2;

FIG. 9 is an enlarged fragmentary transverse vertical sectional view of the apparatus shown in FIGS. 1a–2a.

DESCRIPTION OF THE PREFERRED EMBODIMENTS

Figure 1:
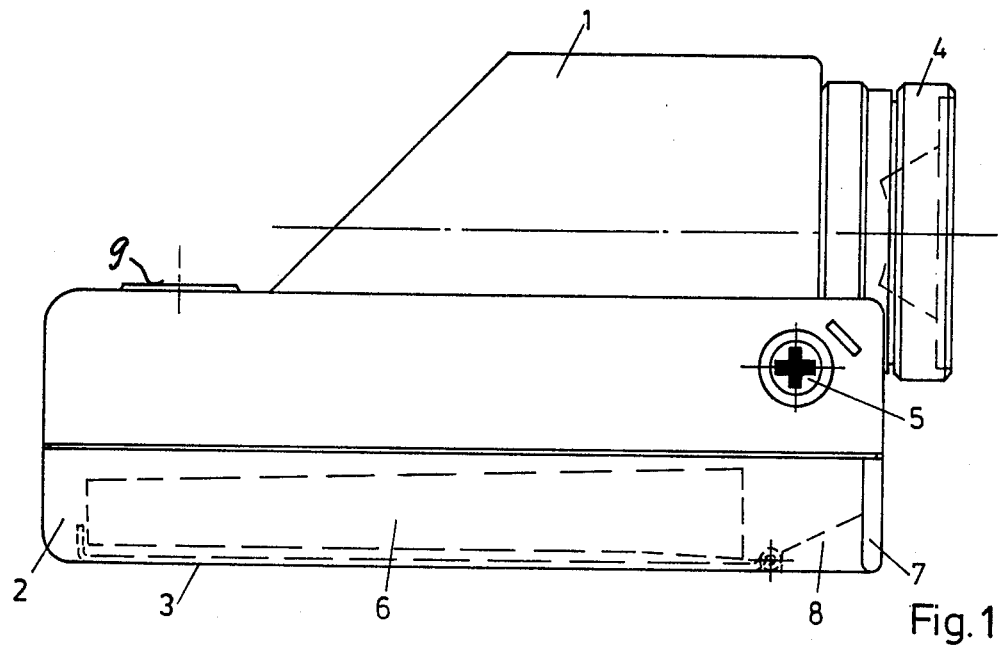
FIG. 1 is a schematic elevational view of a photographic apparatus which embodies one form of the invention.
Figure 2:
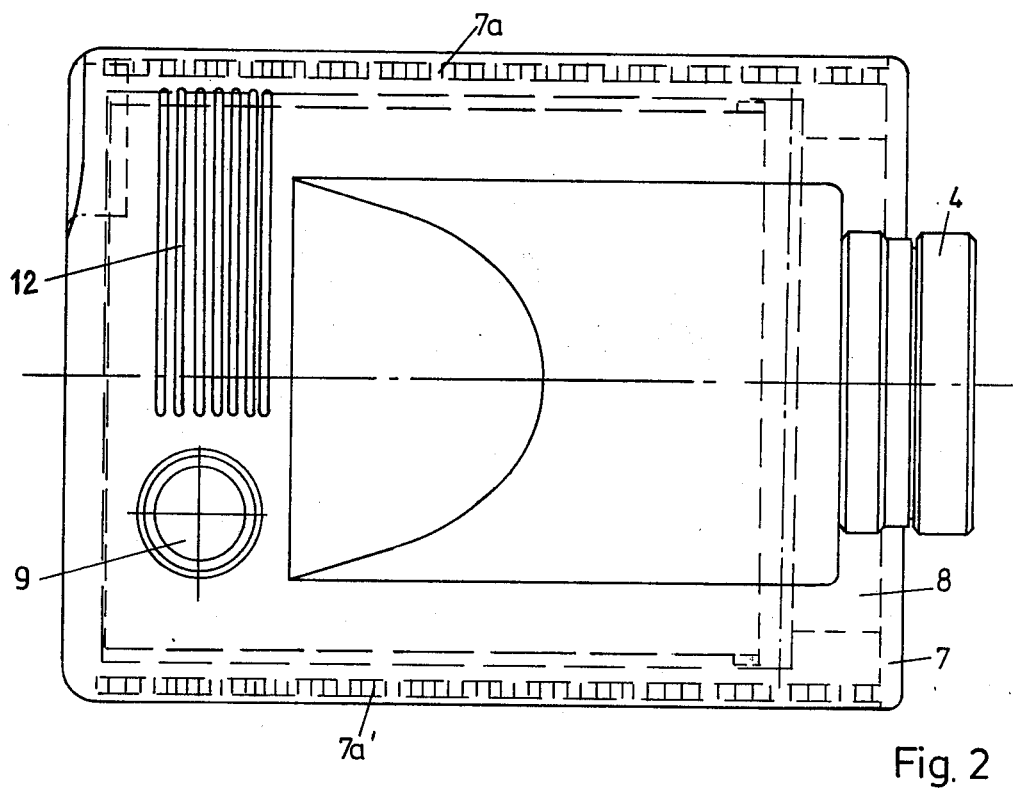
FIG. 2 is a plan view of the apparatus of FIG. 1.

Referring first to FIGS. 1 and 2, there is shown a self developing type photographic apparatus having a housing which includes an upper section 1 and a lower section 2, a cover 3 which forms part of the lower section 2 and can be removed or moved to an open position in which it affords access to a chamber 6 for film containers, a picture taking lens 4 mounted on the front wall of the section 1, an indexible socket 5 which can receive flash lamps (preferably holders for percussively ignitable flash lamps) and is mounted in a side wall of the section 1, a U-shaped handle or yoke 7 which is reciprocably mounted in the section 2 and has two parallel portions 7a, 7a' constituting toothed racks, a finger-receiving recess 8 provided in the underside of the section 2 to afford access to the inner side of the handgrip portion or web 7A of the handle 7, a camera release 9 mounted at the rear end of the top wall of the section 1, and corrugations or ribs 12 adjacent to the release 9 and serving to facilitate gripping of the apparatus during picture taking and/or manipulation of the handle 7.

Figure 1A:
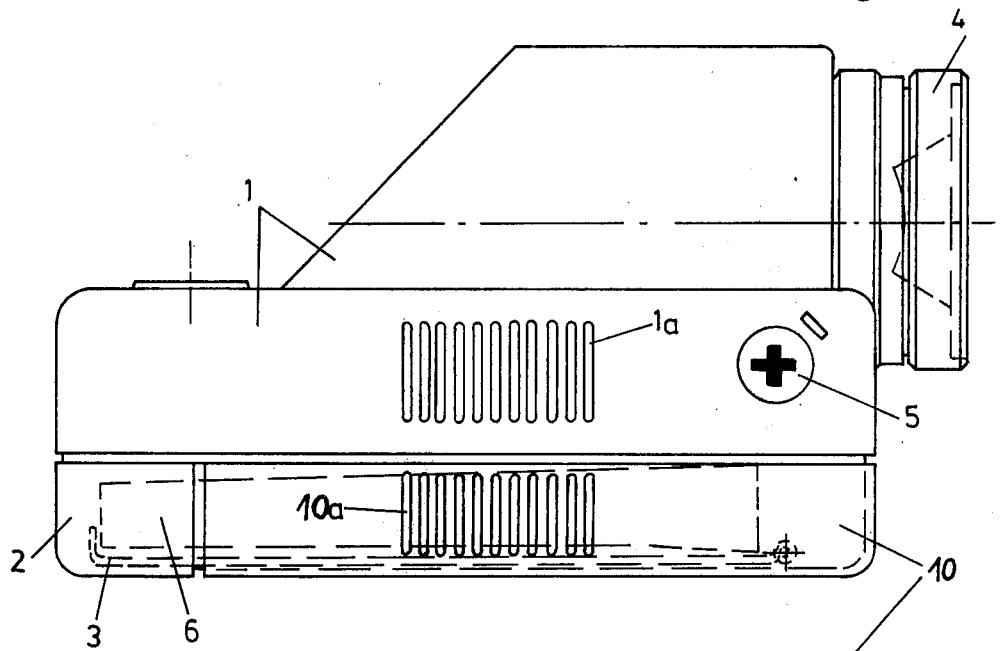
FIG. 1a is an elevational view of a second apparatus.
Figure 2A:
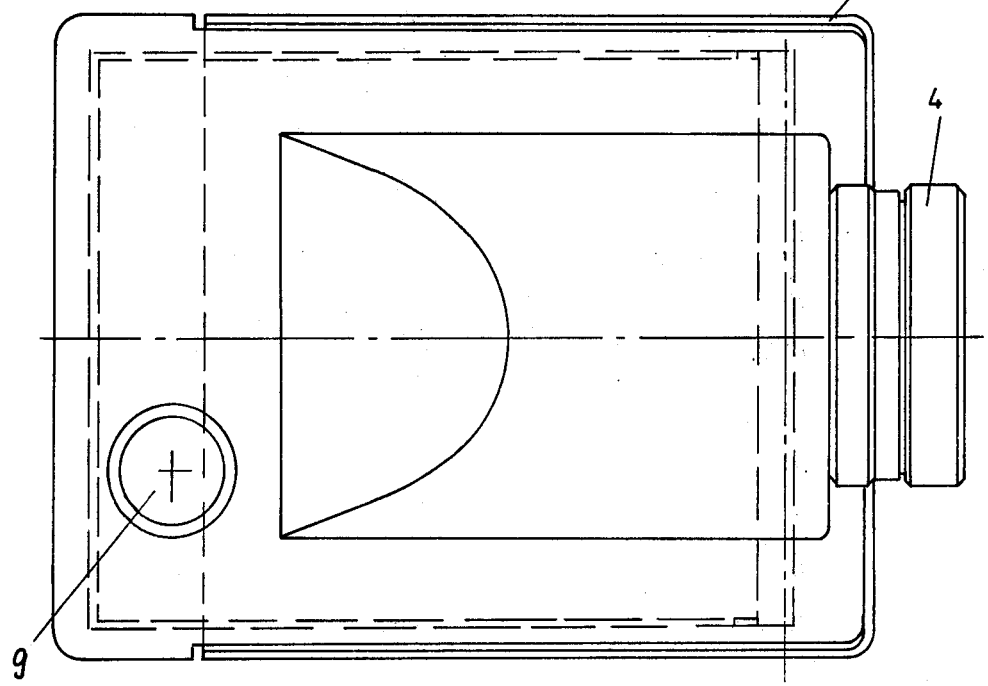

FIGS. 1a and 2a show a modified photographic apparatus wherein the U-shaped handle 7 is replaced with a tray-shaped handle 10 having corrugations or ribs 10a disposed below similar corrugations or ribs 1a forming part of at least one side wall of the upper section 1. The handle 10 is reciprocable in parallelism with the optical axis of the lens 4, the same as the handle 7. The handle 10 is formed with or connected to two parallel toothed racks 107a, 107a' corresponding to the racks 7a, 7a' of the first photographic apparatus.

Figure 3:
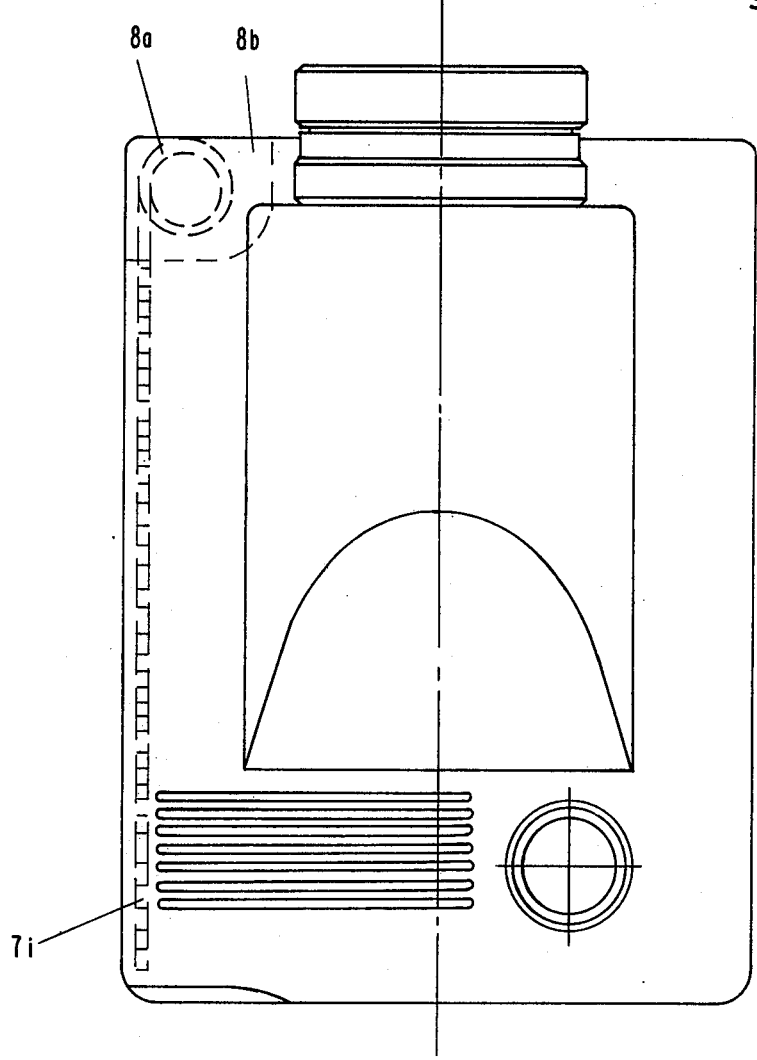
FIG. 3 is a plan view of a third apparatus.
Figure 7:
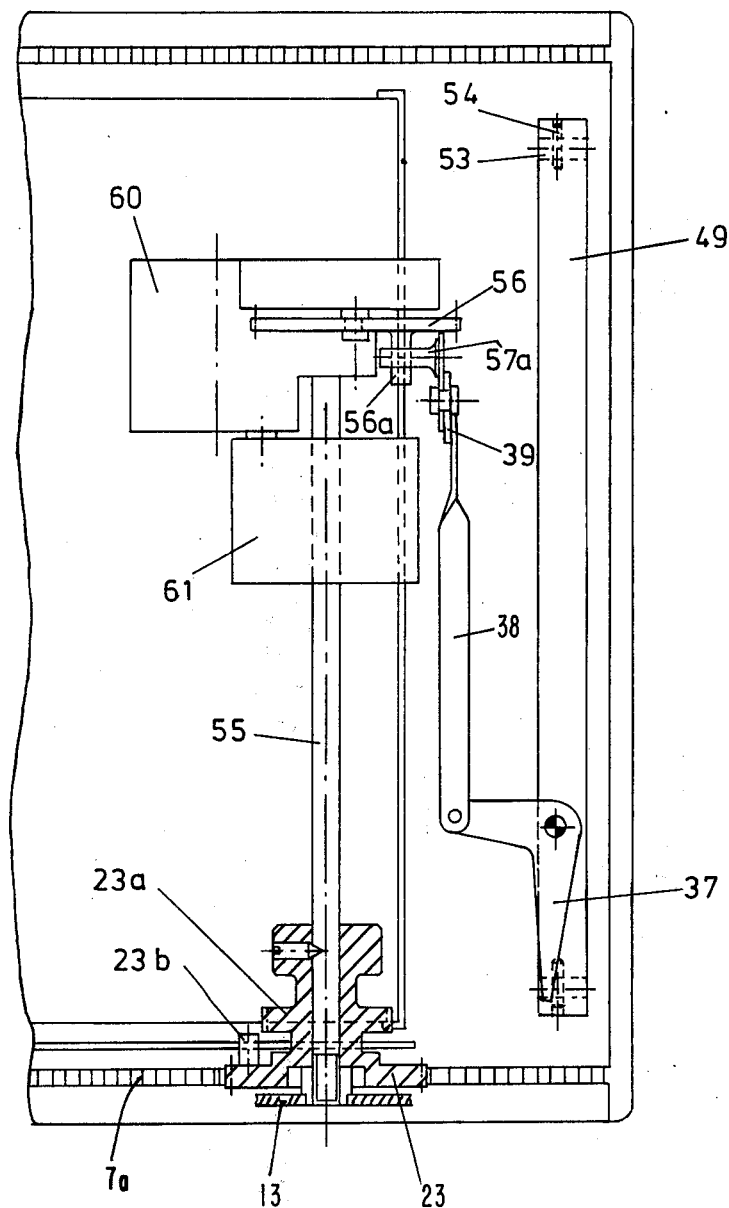
FIG. 7 is another enlarged transverse vertical sectional view of the apparatus of FIGS. 1-2.

The photographic apparatus of FIG. 3 is practically identical with the apparatus of FIGS. 1 and 2 except that it comprises a handle including a single toothed rack 7i which is reciprocable in response to rotation of an annular handgrip means or pinion 8a mounted in the lower section of the housing. The lower section of the housing has a cutout 8b to afford access to the pinion 8a; the latter constitutes a means for moving the rack 7i forwardly or backwards in parallelism with the optical axis of the lens 4.

The purpose of the racks 7a, 7a' or 107a, 107a' or the rack 7i is to expel from the film container a film unit during forward movement, either by means of the handle 7 or 10 or by means of the handle including the rack 7 and pinion 8a. Such forward movement of the film unit automatically entails development of the previously exposed photosensitive frame of such film unit, namely of the topmost or uppermost unit in the container which has been inserted into the chamber 6. At the same time, the topmost film unit is caused to emerge from the lower section of the housing in the region below the lens 4.

FIGS. 4, 5, 5a, 6 and 7 show the details of the photographic apparatus of FIGS. 1–2, with the shutter 17 in cocked position. The lower section 2 of the housing includes or contains two lateral guides 13 and 14 which are parallel to the optical axis of the lens 4. These guides support the trunnions of a driven upper spread roller 15 and a lower spread roller 16. The axes of the rollers 15, 16 are normal to and cross in space with the optical axis of the lens 4.

The shutter 17 is located behind the objective 18 of the lens 4 and is mounted (together with the mount for the objective 18) on a sheet-like metallic carrier 19 which is rigid with the guides 13, 14. These guides further support suitably inclined mirror 20 which images the subject onto the photosensitive frame of the uppermost film unit 41 in the container 42 occupying the chamber 6 of the lower section 2.

The guides 13, 14 are respectively formed with ways 13a, 14a for the toothed racks 7a, 7a' of the handle 7. The racks 7a, 7a' have longitudinally extending reinforcing ribs 7ab and 7a'b which are respectively disposed between a set of upper idler rolls 21 and a set of lower idler rolls 7aa in the respective guides 13, 14.

The trunnions of the driven spread roller 15 are rigid with coaxial pinions 24 which mesh with the respective racks 7a, 7a' so that both ends of the roller 15 receive torque when the handle 7 is moved forwardly or backwards. The direction of forward movement of the handle 7 is indicated by arrow 22. An advantage of the handle 7 (as well as handle 10 of FIGS. 1a, 2a) is that the handle is not likely to jam because each of its racks 7a, 7a' (or 107a, 107a') is in permanent mesh with the respective pinion. Furthermore, such construction prevents the application of twisting or torsional stresses to the driven spreading roller 15.

The diameter of the roller 15 at least equals but preferably exceeds the pitch circles of the pinions 24, i.e., the film unit 41 whose leader has been caused to enter the gap between the spread rollers 15, 16 will advance at a speed which exceeds the speed of forward movement of racks 7a, 7a' when the handle 7 is pulled to move in the direction indicated by arrow 22. In other words, the maximum length of forward movement of handle 7 to its extended position is less than the length of a film unit 41 because the peripheral speed of the roller 15 is greater than that of the pinions 24. This is desirable because the apparatus can employ a handle 7 with relatively short toothed racks 7a, 7a', i.e., the length of the lower housing section 2 need not be increased for the express purpose of accommodating the racks 7a, 7a' when the handle 7 assumes the retracted position shown in FIGS. 1, 2 and 4.

The lower spread roller 16 has trunnions which are movable up and down in vertical slots of the guides 13, 14 (see the slot 13b of the guide 13 in FIG. 4) and is biased upwardly (i.e., toward the driven roller 15) by one or more springs 216 so that its trunnions tend to occupy the upper end portions of the respective vertical slots.

The guide 13 further supports a rotary programming device 23 (hereinafter called gear) having teeth in mesh with the teeth of the rack 7a. The gear 23 is rigid with a ratchet wheel 23a and has an eccentric portion or pin 23b which can engage a projection or follower 25a at the front end of a reciprocable entraining member or control means 25 for an expelling device 27. The latter serves to expel the outermost or uppermost film unit 41 from the container 42 when the entraining member 25 is caused to move forwardly (arrow 35). The guide 13 has one or more pins which extend into or more elongated slots 25b of the entraining member 25 so that the latter is confined to a reciprocatory movement in and counter to the direction indicated by arrow 35 and can perform movements of predetermined length. The entraining member 25 carries a pivotable blocking pawl 26 and a sheet-like displacing member 43 whose pivot is shown at 43a. The rear end portion of the displacing member 43 has a substantially vertical slot 43b. The expelling device 27 is riveted or otherwise secured to the rear end portion of the member 25. The guide 14 supports a reciprocable entraining member 44 which shares all movements of the member 25 and carries a pivotable displacing member 45. The rear end portion of the member 44 is not connected to an expelling device, i.e., it normally suffices to employ a single expelling device.

The camera release 9 comprises a deformable membrane 32 which can be depressed in the direction indicated by arrow 33 and can thereby enable a helical spring 34 to move a slide 28 forwardly (arrow 22) so that the slide can actuate the shutter 17. The section 2 of the housing has pins extending into elongated slots 28a of the slide 28. The means for releasing the slide 28 for forward movement under the action of spring 34 includes an intermediate lever 31 which is pivoted clockwise (as viewed in FIG. 4) in response to deformation of the membrane 32 and a pawl 30 which is pivotable by the lever 31. The pivots for the pawl 30 and lever 31 are mounted on a platen 29 which is installed in the housing section 1.

The operation:

When the user depresses the membrane 32 (arrow 33 in FIG. 4), a microswitch (not shown) is actuated before the lever 31 (which is biased counterclockwise by a spring 31a) pivots the pawl 10 clockwise against the opposition of a spring 30a. The microswitch completes the circuit of a long exposure indicator and actuates the automatic exposure control which insures that, once opened, the shutter 17 remains open for an interval of time which is a function of scene brightness. As the pawl 30 pivots clockwise, its pallet becomes disengaged from a bentover projection or lug 28c at the rear end of the slide 28 so that the latter is free to move forwardly (arrow 35) in response to contraction of the spring 34. The rear end of the slide 28 is further formed with a projection or lug 28b which, while the slide 28 moves forwardly, engages a projection 36a of and thereby pivots clockwise a blocking pawl 36. The latter is pivotable in the housing section 1 and has a tooth 36b which is pivoted out of the path of movement of a projection or lug 25c of the entraining member 25. As the slide 28 continues to move forwardly, its leading edge 28d engages and pivots a bell crank lever 37 (FIGS. 6 and 7) which displaces a connecting link 38 to thereby pivot a shutter releasing element 39. The latter has a tooth 39a which engages complementary tooth 40A of a ring 40 for a set of pivotable shutter blades (not shown) which define a light-admitting aperture in response to anticlockwise angular movement of the ring 40, as viewed in FIG. 6. The ring 40 is biased clockwise by a return spring 59. The closing of the shutter 17 (i.e., the clockwise movement of ring 40 back to its starting position) is determined as a function of scene brightness by the aforementioned automatic electronic exposure control which is energized by the microswitch in response to initial stage of deformation of the membrane 32.

When the exposure is completed, i.e., when the mirror 20 has projected the image of a scene or subject onto the photosensitive frame of the uppermost film unit 41 in the container 42, the operator can develop the exposed sheet of the film unit 41 by pulling the handle 7 forwardly (arrow 22). The racks 7a, 7a' of the handle 7 rotate the gear 23 and the pinions 24 of the upper spread roller 15. The entraining member 25 is biased forwardly by a helical spring 42 and has a stud 25d which abuts against the rear edge face 7b of the rack 7a so that the member 25 begins to move forwardly as soon as the operator starts to pull the handle 7. Thus, the follower 25a of the entraining member 25 moves ahead of the eccentric pin 23b on the gear 23 so that, when the gear 23 completes about one-fourth of a revolution (counterclockwise, as viewed in FIG. 4), the pin 23b begins to push the member 25 by bearing against a shoulder 25g shown in FIG. 4 below the pin 23b. The entraining device 27 enters a slot of the container 42 and begins to advance the uppermost film unit 41 forwardly by means of a claw 27a. The leader of the film unit 41 emerges from an opening in the front end wall of the container 42 and enters the gap between the spread rollers 15, 16.

The gear 23 rotates a shaft 55 (FIG. 7) which constitutes the input element of a step-up transmission 60. The output element of the transmission 60 drives a centrifugal governor 61 by way of a suitable friction clutch, not shown. The governor 61 limits the spread of the pinion 23 irrespective of the magnitude of the force which is applied to pull the handle 7 forwardly.

The shaft 55 further drives a cocking wheel 56 which can rotate through an angle not exceeding 300 degrees in automatic response to rotation of the gear 23. The wheel 56 has a pin 56a which engages the pin 57a of a lever 57 whereby the latter causes a spring-biased pawl 58 (mounted on the lever 57) to engage a pin 40a of the ring 40 and to rotate the latter counterclockwise, as viewed in FIG. 6, so that the tooth 39a of the element 39 reengages the tooth 40A of the ring 40 to maintain the shutter 17 in cocked position. The spring-biased pawl 58 thereupon bypasses the pin 40a so that the ring 40 remains in the position shown in FIG. 6 against the opposition of the spring 59.

The cocking wheel 56 rotates clockwise in response to forward movement of the handle 7 so that the lever 57 pivots under the action of a spring 62 and returns into abutment with a stop 63. Also, as the handle 7 moves forwardly, the forwardly projecting extensions or tongues (see the tongue 43c of FIG. 4) of the displacing members 43, 45 engage the respective end portions of the roller 16 and move the latter downwardly (i.e., away from the rotating roller 15) so that the width of the gap between the rollers 15, 16 increases. The tongues or extensions of the displacing members 43, 45 are located ahead of the leading edge of the uppermost film unit 41 so that the latter can readily enter the enlarged gap between the rollers 15, 16. It will be recalled that the lower roller 16 is biased upwardly by one or more springs 216. Once a certain length of the film unit 41 has entered into and advanced beyond the gap between the rollers 15, 16, the width of the gap is reduced so that the film unit can be moved forwardly by the rotating roller 15.

The forward movement of entraining member 25 under the action of spring 42 is terminated when the aforementioned pins of the housing enter the rearmost ends of the slots 25b. The eccentric portion 23b of the gear 23 is then free to bypass the follower 25a of the entraining member 25, i.e., the gear 23 can continue to rotate in response to forward movement of the handle 7. Such forward movement is terminated when a pin 7c of the rack 7a reaches and abuts a shoulder 13c of the guide 13. A similar pin can be provided on the rack 7a' to abut against a shoulder of the guide 14 when the handle 7 reaches its foremost position. At such time, the tongues of the displacing members 43, 45 (see the tongue 43c in FIG. 4) are located ahead of the lower roller 16 so that the latter moves upwardly and bears against the underside of the film unit 41.

FIG. 5 shows two strips 49 and 50 which engage and clamp a flexible elastic light-obstructing member or flap 51 behind an outlet slot 52 in the front wall of the housing. The light obstructing member 51 deflects the leader of the film unit 41 downwardly. The strip 49 carries two symmetrical intercepting elements 53 which are pivotable on pins 54 and serve to prevent the trailing end 41a of the film unit 41 from reentering the gap between the rollers 15, 16 when the handle 7 is pushed to move counter to the direction indicated by arrow 22. Thus, the fully expelled film unit cannot reenter the container 42 even if it is not removed while the handle 7 is caused to move back toward the position shown in FIG. 4. The intercepting elements 53 are preferably adjacent to the side walls of the lower housing section 2 so that they move behind the respective portions of the trailing end 41a of the fully expelled film unit 41. The elements 53 are biased by springs (see the spring 49a in FIG. 5). The springs 49a urge the elements 53 against a stationary anvil 53A mounted in the housing in front of the roller 16.

The ratchet wheel 23a cooperates with a holding pawl 46 so as to prevent the gear 23 from rotating in a clockwise direction, as viewed in FIG. 4 or 5a. Thus, once the handle 7 has been moved from its fully retracted position, it cannot move back to such fully retracted position except after reaching the fully extended position. The cam face 7d at the rear end of the rack 7a then engages a projection 46a of the pawl 46 and pivots the latter anticlockwise, as viewed in FIG. 2a, about a pin 47 so that the pallet of the pawl 46 is disengaged from the teeth of the ratchet wheel 23a. The right-hand end of the spring 42 is attached to a post or extends into a hole of the pawl 46 and, when the cam 7b engages and pivots the pawl 46, the latter rapidly snaps over as soon as the right hand end of the spring 42 moves to a level above the axis of the pin 47 for the pawl 46. This insures that the handle 7 can be pushed back to its fully retracted position. the expelled (but not detached) film unit 41 is located in the space between and is protected by the web 7A and racks 7a, 7a' of the handle 7, and can be detached from the next film unit while the handle 7 dwells in the extended position.

During movement of the handle 7 back to the retracted position of FIG. 4, the rear edge faces 7b of the racks 7a, 7a' engage the studs 25d of the respective entraining members and push these members rearwardly against the opposition of the spring or springs 42. The eccentric portion 23b of the gear 23 trails the follower 25a of the respective entraining member 25 and returns to the position shown in FIG. 4. The tongues of the displacing members 43, 45 move along suitable cam faces (see the cam face 13d) of the guides 13, 14 and reassume their initial positions in which the width of the gap between the rollers 15, 16 is minimal or zero. The pawl 26 has an edge face 26a which engages a projection 28g of the slide 28 and pushes the latter rearwardly so that the lug 28c reengages the pallet of the pawl 30. The arm 26b of the pawl 26 engages a fixed stop pin 64 so that the pawl 26 is pivoted with respect to the entraining member 25 and its arm 26b is disengaged from the projection 28g so that the slide 28 moves forwardly under the action of spring 34 until its projection 28c reaches the pallet of the pawl 30. The lug 28b moves away from the blocking pawl 36 which is biased by a torsion spring or the like so that it reassumes its blocking position.

During the last stage of movement of handle 7 back to the retracted position, a pin 7d at the forward end of the handle passes through a slot in the housing section 2 and displaces an intermediate slide 48 which engages a shoulder 46b of the pawl 46 and returns the latter into engagement with the ratchet wheel 23a.

The housing further contains suitable detent means (e.g., spring-biased balls mounted in the racks 7a, 7a' and entering sockets in the guides 13, 14 when the handle 7 reassumes its fully retracted position) to insure that the spring 42 cannot expel the handle before the operator applies to the web 7A a pull which suffices to deactivate the detent means.

The wheel 56 automatically cocks the shutter 17 by rotating the wheel 40 until the tooth 39a of the element 39 reengages the tooth 40A. The apparatus is then ready to make an exposure.

The manner in which a destructible receptacle for developing liquid bursts during travel of the uppermost film unit 41 between the rollers 15, 16 is known in the art and, therefore, such receptacle is not specifically shown in the drawing.

Figure 8:
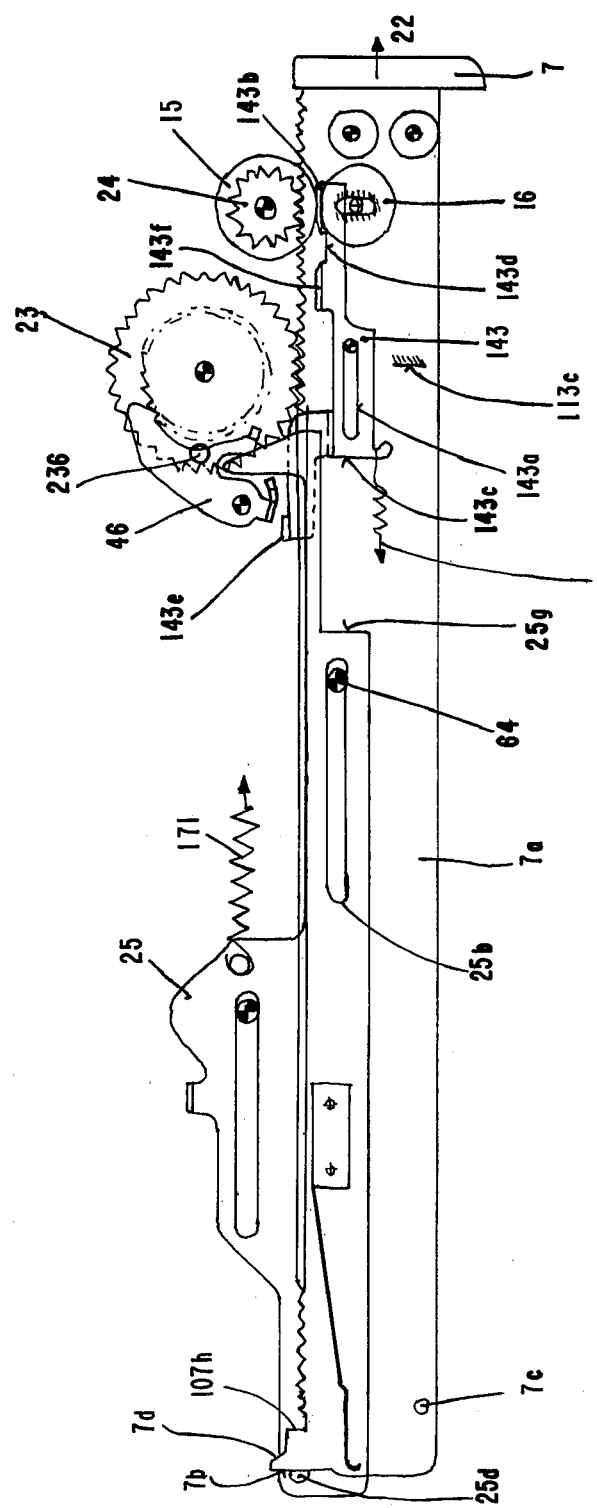
FIG. 8 is a fragmentary longitudinal sectional view of a further photographic apparatus.

FIG. 8 shows a portion of a modified photographic apparatus which employs one or more displacing members 143 designed to insure that the width of the gap between the spread rollers 15, 16 increases while the exposed frame of the uppermost film unit (not shown) is being developed as a result of spreading of a metered quantity of developing liquid. This, in turn, insures that the film unit portion which includes the exposed film frame can readily pass between the rollers 15, 16 as well as that the trap for the developing liquid does not burst open during spreading of the liquid. Such bursting of the trap could take place in an extreme situation, e.g., at a temperature and/or pressure which is outside of an anticipated range so that the quantity of developing liquid which is used to develop the exposed frame would exceed the desired or permissible quantity.

FIG. 8 shows one of the displacing members 143 in the starting position, i.e., in the fully retracted position of the handle 7. The displacing member 143 has an elongated slot 143a for a guide pin 143A, a tongue or extension 143B which has two relatively wide portions 143b, 143f separated by a recess 143d, and a rear edge face 143c. A helical spring 170 is anchored in the housing of the apparatus and tends to move the displacing member 143 rearwardly (counter to the direction indicated by arrow 22) so that the pin 143a is normally located in the front end portion of the slot 143a. The foremost wide portion 143b is located between the rollers 15, 16 so that the gap between these rollers is rather wide and allows for practically unobstructed entry of the leader of the uppermost film unit.

When the user of the photographic apparatus completes an exposure, the handle 7 is pulled in the direction indicated by arrow 22 whereby the rack 7a rotates the pinion 24 of the upper spread roller 15 and the gear 23. The stud 25d of the entraining member 25 abuts against the rear edge face 7b of the rack 7a so that the member 25 moves forwardly under the action of the spring 171 while the handle 7 moves in the direction indicated by arrow 22. Shortly after the handle 7 leaves the starting position of FIG. 8, the eccentric portion 23b of the gear 23 engages the follower 25a and pushes the entraining member 24 forwardly, the same as described in connection with the apparatus of FIG. 4. The leader of the uppermost film unit thereupon enters the gap between the spread rollers 15, 16 and the shoulder 25g of the entraining member 25 for the expelling device 27 abuts against the rear edge face 143c of the displacing member 143 so that the latter moves forwardly and moves the foremost wide portion 143b beyond the gap between the rollers 15, 16. When the width of such gap decreases (because the recess 143d is located between the rollers 15, 16, the forward movement of the member 25 is terminated because the guide pin 64 is located in the rearmost portion of the slot 25b. From then on, the film unit is advanced by the driven spread roller 15. The rear wide portion 143f of the tongue 143B enters between the rollers 15, 16 and increases the width of the gap while the exposed frame of the film unit passes between the spread rollers. Therefore, the developing liquid is unlikely to destroy the trap which the film unit defines in the region of the film frame so that the frame is properly developed and the film unit effectively prevents uncontrolled escape of liquid into the film container or into the photographic apparatus. A shoulder 107h of the rack 7a engages and entrains a lug 143e of the displacing member 143 to move the wide portion 143f of the tongue 143B between the rollers 15, 16 in order to widen the gap during development of the frame; as mentioned above, the recess 143d is moved between the rollers 15, 16 by the edge face 25g of the entraining member 25 prior to stoppage of the entraining member in the right-hand end position thereof. The cam 7d of the rack 7a serves the same purpose as described in connection with FIG. 4, i.e., to cause the holding pawl 4b to snap over and permit rotation of the gear 23 during movement of the handle 7 back to the fully retracted position of FIG. 8.

When the handle 7 is caused to move backwards, the spring 170 pulls the displacing member 143 counter to the direction indicated by arrow 22 so that the portion 143b of the tongue 143B is withdrawn from the gap between the rollers 15 and 16. The shoulder 107h has moved away from the lug 143e so that the displacing member 143 is free to follow the bias of the spring 170. The shoulder 143c of the displacing member 25 thereupon reaches the shoulder 25g so that the width of the gap between the rollers 15, 16 decreases because the gap receives the recess 143d, i.e., the width of the gap is minimal or zero and the exposed and freshly developed film unit cannot move backwards toward the gear 23. The rearward movement of the handle 7 continues whereby the rear edge face 7b engages and pushes the stud 25d of the entraining member 25 to move the latter back to the starting position of FIG. 8. The spring 170 is free to contract and pulls the portion 143b of the tongue 143B between the rollers 15, 16 to increase the width of the gap. The apparatus is ready to make a further exposure as soon as the handle 7 reassumes its retracted position.

All other parts and functions of the apparatus are preferably identical and/or analogous to those of the apparatus shown in FIG. 4.

Figure 9:
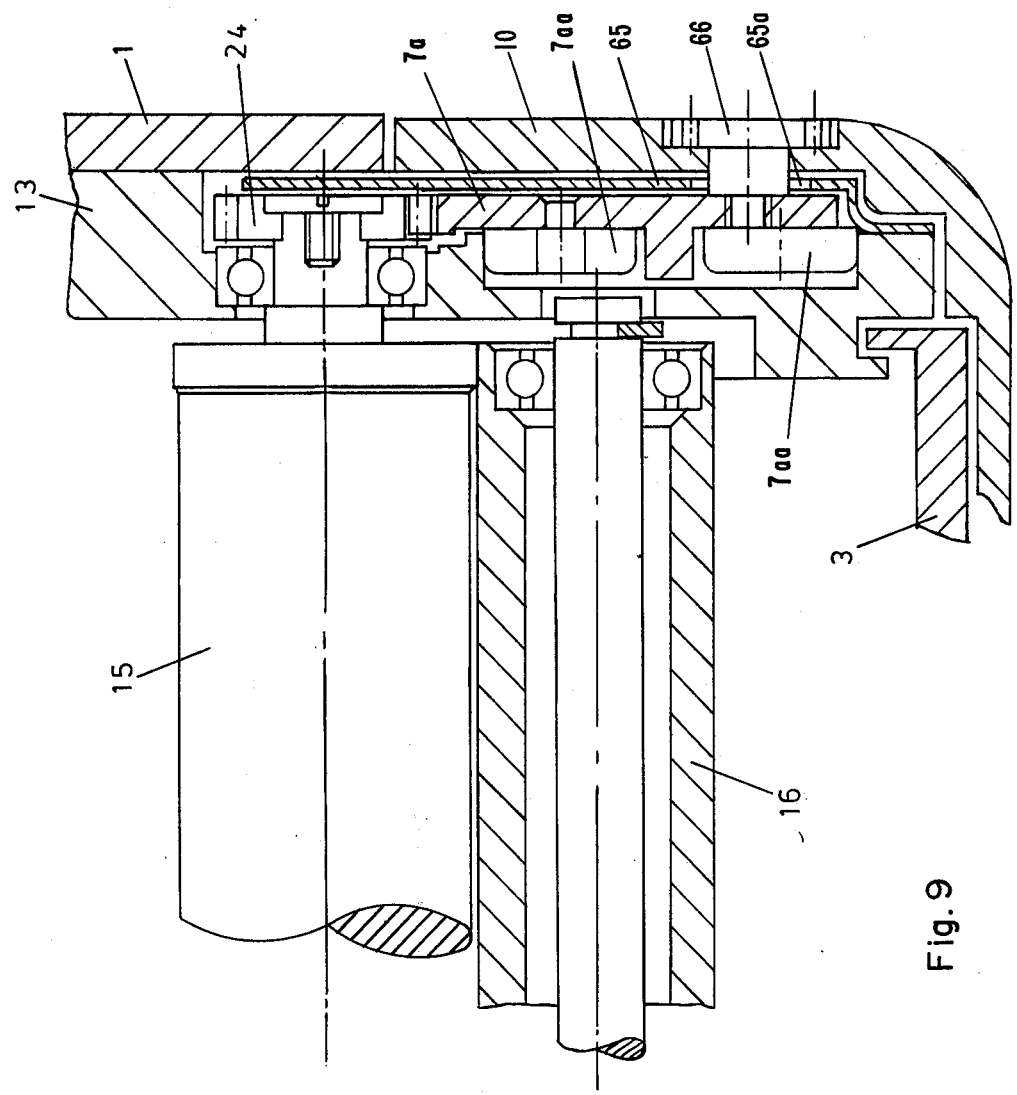

FIG. 9 shows a portion of a photographic apparatus which is identical with or similar to the apparatus of FIGS. 1a, 2a. The racks 107a, 107a' (only the rack 170a shown in FIG. 9) form part of a tray-shaped handle 10. The housing of the photographic apparatus includes plate- or sheet-like light traps 65 having slots 65a for screws 66 which connect the accessible outer portion of the handle 10 with the respective racks. The light traps 65 further serve as a means for shielding the rolls 7aa and the racks 107a, 107a' against contact with dust and other foreign matter. If desired, the main portion of the handle 10 can support additional shields to prevent uncontrolled penetration of light,, solid particulate matter and/or moisture into the interior of the housing.

The improved photographic apparatus is susceptible of many additional modifications. For example, the toothed rack or racks may have an oval or circular cross-sectional outline because such racks can be readily associated with means for sweeping foreign matter off those portions of racks which are being pushed into the housing, i.e., during movement of handle 10 to the fully retracted position of FIGS. 1a, 2a. Also, the parts 13, 14, 19, and the rear walls of the housing sections can be replaced with a closed rigid frame. Furthermore, the ratio of the diameters of the roller 15 and pinions 24 can be changed to change the speed at which a film unit passes between the rollers 15, 16 during extraction of the handle.

It is further within the spirit of the invention to change the configuration of means for changing the width of the gap between the rollers 15, 16 in a predetermined sequence and during predetermined stages of movement of the handle relative to the housing. Such means may include one or more diskshaped or otherwise configurated cams, projections, linkages or gears. Also, the tongue of each displacing member can be located between the rollers 15, 16 in all positions of the handle. The tongues may resemble forwardly tapering wedges and the displacing members may include or constitute detent means for yieldably holding the handle in the extended position Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a self developing type photographic apparatus for use with film units which are developed in response to expulsion from a container therefor, a combination comprising a housing having a chamber for containers and an outlet for successive exposed film units; a handle reciprocably mounted in the housing and movable extended and retracted positions said handle having at least one toothed rack extending in parallelism with the direction of reciprocatory movement of the handle; a pair of parallel spread rollers mounted in said housing and extending substantially at right angles to said direction, said rollers defining gap in line with said outlet; means for rotating one of said rollers in response to reciprocation of said rack so that said one roller advances a film unit which has been introduced into said gap toward and through said outlet while said handle moves toward said extended position; a rotary programming device receiving torque from said rack; means for expelling a freshly exposed film unit from a container in said housing into said gap; and control means receiving motion from said programming means to actuate said expelling means in response to rotation of said programming device during movement of said handle to said extended position.

2. A combination as defined in claim 1, further comprising means for biasing the other of said rollers toward said one roller and displacing means for moving said other roller away from said one roller to thereby increase the width of said gap during introduction of the leader of a freshly exposed film unit between said rollers.

3. A combination as defined in claim 1, wherein said one roller comprises a pinion meshing with said rack and constituting said rotating means.

4. A combination as defined in claim 1, wherein said handle is reciprocable by hand and the container in said housing has a slot for entry of said expelling means during movement of said handle to said extended position to expel the outermost film unit of a stack of such units into said gap, said container further comprising means for discharging a developing liquid onto the outermost film unit so that such liquid is caused to spread over and develops the exposed frame of the film unit during passage of the film unit through said gap.

5. A combination as defined in claim 1, wherein said handle includes two parallel portions one of which constitutes said rack.

6. A combination as defined in claim 5, wherein said handle is a U-shaped yoke and each of said parallel portions thereof constitutes a rack, said means for rotating said one roller comprising two pinions rigid with the two ends of said one roller and each meshing with a different one of said racks.

7. A combination as defined in claim 1, wherein said rotating means comprises a pinion rigid and coaxial with said one roller and meshing with said rack, the pitch diameter of said pinion being at most equal to the diameter of said one roller so that the peripheral speed of said one roller during movement of said handle at least equals the peripheral speed of said pinion.

8. A combination as defined in claim 1, wherein said handle comprises a handgrip portion.

9. A combination as defined in claim 1, wherein said handle is a tray.

10. A combination as defined in claim 1, further comprising a shutter mounted in said housing and having a portion movable between cocked and uncocked positions; means for moving said portion of said shutter to cocked position in response to rotation of said programming device during movement of said handle to said retracted position, and release means mounted in said housing and actuatable to effect a movement of said shutter portion to said uncocked position in the retracted position of said handle to thereby expose a film unit in a container in said housing.

11. A combination as defined in claim 1, wherein said control means comprises an entraining member which is reciprocable in said housing in substantial paralleliam with said rack and comprises a follower, said programming device having a portion arranged to engage said follower and to move said entraining member in the direction of movement of said rack during movement of said handle to said extended position whereby said entraining member causes said expelling means to move the freshly exposed film unit from a container in said housing into the gap between said rollers so that said rollers thereupon advance the film unit toward and through said outlet in response to further movement of said handle toward said extended position.

12. A combination as defined in claim 11, further comprising a shutter mounted in said housing and having a portion movable between cocked and uncocked positions, means for cocking said shutter portion during movement of said handle to said retracted position, a camera release mounted in said housing and actuatable to effect a movement of said shutter portion to uncocked position in the retracted position of said handle to thereby expose a film unit in a container in said housing, and means for normally blocking the movement of said entraining member with said rack in said retracted position of said handle, said release means having means for disengaging said blocking means from said entraining member in response to actuation of said release means.

13. A combination as defined in claim 12, further comprising resilient means for biasing said entraining member in said direction and for moving said follower into the range of said portion of said programming means upon disengagement of said blocking means.

14. A combination as defined in claim 1, further comprising means for limiting the speed of movement of said handle to said extended position.

15. A combination as defined in claim 14, wherein said speed limiting means comprises a centrifugal governor receiving torque from said programming means.

16. A combination as defined in claim 1, further comprising means for holding said programming means against rotation in one direction during movement of said handle to said extended position and means for disengaging said holding means prior to movement of said handle from said extended position.

17. A combination as defined in claim 16, wherein said holding means comprises a sprocket wheel rigid with said programming means and a pawl pivotably mounted in said housing and normally engaging said wheel, said means for disengaging said holding means comprising a device provided on said handle and arranged to pivot said pawl out of engagement with said wheel during the last stage of movement of said handle to said extended position.

18. A combination as defined in claim 17, wherein said handle further comprises means for pivoting said pawl back into engagement with said wheel in response to completed movement of said handle to said retracted position.

19. A combination as defined in claim 1, further comprising a shutter movable between cocked and uncocked positions, means for cocking said shutter during movement of said handle of said retracted position, a camera release actuatable to effect a movement of said shutter to uncocked position in the retracted position of said handle to thereby expose a film unit in a container in said housing, said release including a slide reciprocable in said housing from a first to a second position to thereby uncock said shutter, said control means including means for moving said slide to said first position in response to movement of said handle to said retracted position.

20. A combination as defined in claim 1, further comprising means for preventing backward movement of a film unit which has passed between said rollers during movement of said handle to said retracted position.

21. A combination as defined in claim 1, further comprising means for deflecting the film unit which issues from said outlet.

22. A combination as defined in claim 21, wherein said deflecting means comprises an elastic flap intermediate said rollers and said outlet.

23. A combination as defined in claim 1, wherein said housing comprises a guide having ways for said rack.

24. A combination as defined in claim 23, wherein said rack has a longitudinally extending rib and said guide includes rolls engaging said rib.

25. A combination as defined in claim 1, further comprising means for displacing said other roller relative to said one roller so as to increase the width of said gap during the initial and last stages of movement of a film unit between said rollers.

26. A combination as defined in claim 25, wherein said displacing means includes an extension movable between said rollers in response to movement of said handle to said extended position and having portions of greater and lesser width.

27. A combination as defined in claim 26, wherein said portions of greater width include a first portion which is located between said rollers during entry of the leader of a film unit into said gap and a second portion which is located in said gap during movement of the trailing portion of a film unit between said rollers.

* * * * *